（12） United States Patent
Vollmer

(10) Patent No.: US 8,441,158 B2
(45) Date of Patent: May 14, 2013

(54) LINEAR MOTOR WITH REDUCED FORCE RIPPLE

(75) Inventor: Rolf Vollmer, Gersfeld (DE)

(73) Assignee: Siemens Aktiengesellschaft, München (DE)

(*) Notice: Subject to any disclaimer, the term of this patent is extended or adjusted under 35 U.S.C. 154(b) by 276 days.

(21) Appl. No.: 13/027,754

(22) Filed: Feb. 15, 2011

(65) Prior Publication Data

US 2012/0038228 A1 Feb. 16, 2012

(30) Foreign Application Priority Data

Feb. 16, 2010 (DE) .......................... 10 2010 001 997

(51) Int. Cl.
H02K 41/02 (2006.01)
H02K 41/03 (2006.01)
(52) U.S. Cl.
USPC ...................... 310/12.14; 310/12.21; 310/179; 310/184
(58) Field of Classification Search ............... 310/12.14, 310/12.21, 179, 184; H02K 41/02, 41/03
See application file for complete search history.

(56) References Cited

U.S. PATENT DOCUMENTS

| 5,783,878 | A * | 7/1998 | Tozoni ....................... 310/12.23 |
| 6,483,221 | B1 | 11/2002 | Pawellek |
| 6,628,031 | B2 | 9/2003 | Vollmer |
| 6,768,238 | B2 | 7/2004 | Knauff et al. |
| 6,812,612 | B2 | 11/2004 | Schunk |
| 6,858,965 | B2 | 2/2005 | Mueller et al. |
| 6,885,187 | B2 | 4/2005 | Duenisch et al. |
| 6,943,467 | B2 | 9/2005 | Potoradi et al. |
| 7,141,905 | B2 | 11/2006 | Vollmer |
| 7,285,883 | B2 | 10/2007 | Bott et al. |
| 7,564,158 | B2 | 7/2009 | Huth et al. |
| 7,573,162 | B2 * | 8/2009 | Yura et al. .................. 310/12.21 |
| 7,705,507 | B2 | 4/2010 | Vollmer |
| 7,709,984 | B2 | 5/2010 | Braun et al. |
| 7,732,967 | B2 | 6/2010 | Vollmer et al. |
| 7,755,315 | B2 | 7/2010 | Bott et al. |
| 7,777,373 | B2 | 8/2010 | Bott et al. |
| 7,859,160 | B2 | 12/2010 | Vollmer |
| 7,893,569 | B2 | 2/2011 | Jajtic et al. |
| 7,915,777 | B2 | 3/2011 | Vollmer |
| 2003/0011267 | A1 | 1/2003 | Vollmer |
| 2003/0094940 | A1 | 5/2003 | Duenisch et al. |
| 2003/0173853 | A1 | 9/2003 | Knauff et al. |
| 2004/0075359 | A1 | 4/2004 | Muller et al. |
| 2004/0084989 | A1 | 5/2004 | Schunk |
| 2004/0155539 | A1 | 8/2004 | Potoradi et al. |
| 2004/0261553 | A1 | 12/2004 | Bott et al. |

(Continued)

FOREIGN PATENT DOCUMENTS

| DE | 101 63 626 A1 | 7/2003 |
| DE | 10 2005 020 504 A1 | 11/2006 |
| EP | 2 073 351 A1 | 6/2009 |

*Primary Examiner* — John K Kim
(74) *Attorney, Agent, or Firm* — Henry M. Feiereisen LLC

(57) ABSTRACT

To further reduce force ripple of a linear motor, a primary part has a plurality of windings sequentially arranged in an axial direction and subdivided in the axial direction into groups having an identical number of windings. The sequence of the association of the windings with the phases of a multi-phase system is not repeated at least in a group of windings within the primary part as long as the winding sense of the corresponding windings in the group is maintained.

8 Claims, 4 Drawing Sheets

U.S. PATENT DOCUMENTS

| | | |
|---|---|---|
| 2005/0231060 A1 | 10/2005 | Vollmer |
| 2006/0219880 A1 | 10/2006 | Braun et al. |
| 2007/0035193 A1 | 2/2007 | Huth et al. |
| 2007/0040466 A1 | 2/2007 | Vollmer |
| 2007/0114861 A1 | 5/2007 | Bott et al. |
| 2007/0257566 A1 | 11/2007 | Vollmer |
| 2007/0257575 A1 | 11/2007 | Vollmer |
| 2008/0073985 A1 | 3/2008 | Bott et al. |
| 2008/0164777 A1 | 7/2008 | Braun et al. |
| 2008/0169718 A1 | 7/2008 | Schunk et al. |
| 2008/0185931 A1 | 8/2008 | Platen et al. |
| 2008/0197741 A1 | 8/2008 | Vollmer et al. |
| 2008/0197742 A1 | 8/2008 | Vollmer |
| 2008/0289440 A1 | 11/2008 | Vollmer et al. |
| 2008/0315704 A1 | 12/2008 | Vollmer |
| 2009/0009114 A1 | 1/2009 | Schunk et al. |
| 2009/0015080 A1 | 1/2009 | Vollmer et al. |
| 2009/0039713 A1 | 2/2009 | Bott et al. |
| 2009/0072634 A1 | 3/2009 | Vollmer |
| 2009/0152959 A1 | 6/2009 | Vollmer |
| 2009/0152976 A1 | 6/2009 | Bott et al. |
| 2009/0160283 A1 | 6/2009 | Vollmer et al. |
| 2009/0184602 A1 | 7/2009 | Braun et al. |
| 2009/0206681 A1 | 8/2009 | Jajtic et al. |
| 2009/0206686 A1 | 8/2009 | Vollmer |
| 2009/0212644 A1 | 8/2009 | Bott et al. |
| 2009/0218904 A1 | 9/2009 | Vollmer |
| 2009/0251013 A1 | 10/2009 | Vollmer et al. |
| 2009/0295236 A1 | 12/2009 | Bott et al. |
| 2009/0295251 A1 | 12/2009 | Vollmer et al. |
| 2009/0302832 A1 | 12/2009 | Budde et al. |
| 2009/0315424 A1 | 12/2009 | Vollmer |
| 2009/0322174 A1 | 12/2009 | Grossmann et al. |
| 2010/0000830 A1 | 1/2010 | Budde et al. |
| 2010/0013332 A1 | 1/2010 | Vollmer |
| 2010/0013333 A1 | 1/2010 | Vollmer |
| 2012/0038228 A1* | 2/2012 | Vollmer .................. 310/12.14 |

* cited by examiner

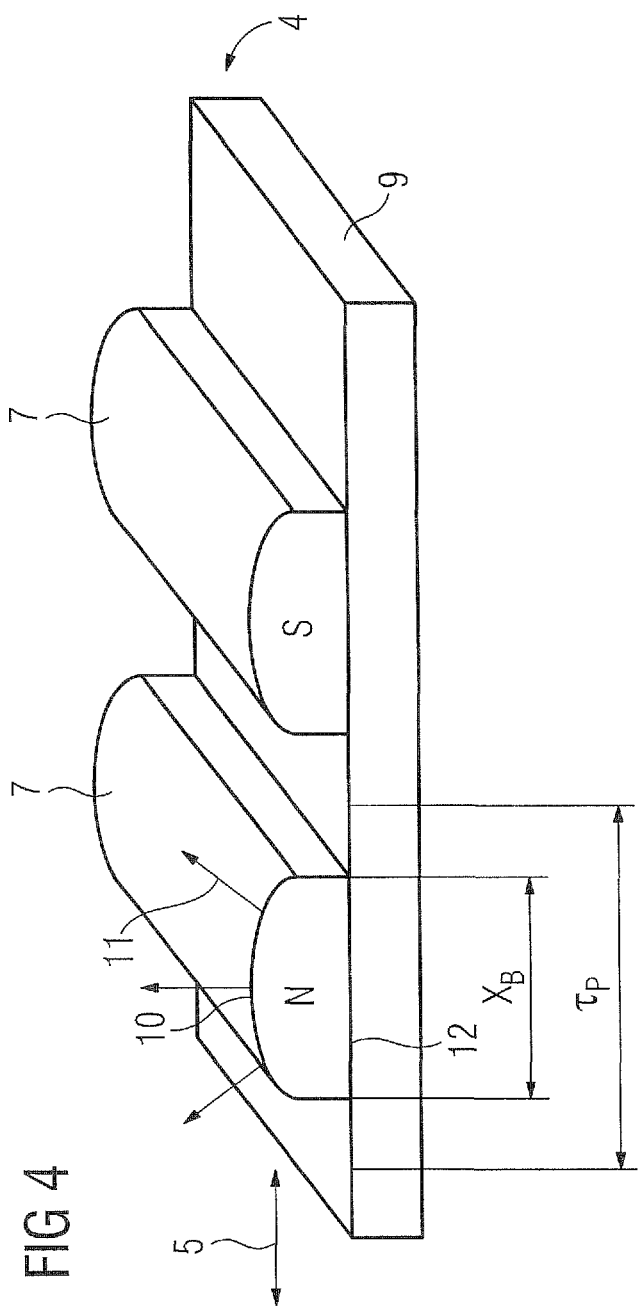

US 8,441,158 B2

LINEAR MOTOR WITH REDUCED FORCE RIPPLE

CROSS-REFERENCES TO RELATED APPLICATIONS

This application claims the priority of German Patent Application, Serial No. 10 2010 001 997.6, filed Feb. 16, 2010, pursuant to 35 U.S.C. 119(a)-(d), the content of which is incorporated herein by reference in its entirety as if fully set forth herein.

BACKGROUND OF THE INVENTION

The present invention relates to a linear motor having reduced force ripple.

The following discussion of related art is provided to assist the reader in understanding the advantages of the invention, and is not to be construed as an admission that this related art is prior art to this invention.

Permanent-magnet linear motors generally have a certain amount of force ripple. This disturbing force ripple is caused, inter alia, by the reluctance forces between the permanent magnets and the teeth of the primary part, as well as the interaction between the secondary and primary magnetic fields in the air gap. However, it is desirable for linear motors, and in particular also cylindrical linear motors to produce the same forces with the same current in the permissible axial movement range. Only when scarcely any force fluctuations occur over the movement range with the same current, is the force ripple appropriately low.

It would be desirable and advantageous to address this problem and to obviate other prior art shortcomings by reducing the force ripple.

SUMMARY OF THE INVENTION

According to one aspect of the present invention, a linear motor includes a primary part in form of a cylinder or cuboid and having a plurality of windings sequentially arranged in an axial direction and subdivided in the axial direction into groups having an identical number of windings, each of the windings associated with one phase of a multi-phase system, with the primary part being divided in the axial direction into a first section and a second section, wherein an identical number of windings is associated with each of the phases in the second section, and a secondary part having a secondary part length, wherein an axial length of the first section corresponds to the secondary part length. A sequence of the association of the windings with the phases in combination with a winding sense of the windings in at least one of the groups in the axial direction differs from the sequence of the association of the windings with the phases in combination with a winding sense of the windings in each of the other groups within the first section of the primary part. In addition, the sequence of the association of the windings with the phases in combination with a winding sense of the windings in the second section corresponds to the association of the windings with the phases in combination with a winding sense of the windings in a subsection of the first section having an axial length identical to that of the second section and is arranged at the end of the first section facing the second section.

Since the sequence of the windings associated with the individual phases in combination with the winding sense is not repeated along the movement direction of the linear motor, the same force constellations do not occur in a length of the primary part which corresponds to the secondary part. This therefore results in the forces almost always being the same, irrespective of the position of the secondary part, when the current is the same.

The windings are preferably designed for three-phase operation. A cylindrical or cuboid linear motor with little force ripple can therefore be produced for the conventional polyphase power supply.

It is particularly advantageous if the primary part has a number of slots N and a number of pole pairs p in the first section and a least common multiple: kgV (N, 2p)≧N·p. Such a high least common multiple of the number of slots and the number of poles additionally leads to reduced forced ripple.

Furthermore, the first section can be axially subdivided into a first half and a second half, and the windings in the first half have a different winding sense than in the second half.

The maximum travel of the linear motor should be less than or equal to the axial length of the second section of the primary part. Therefore, during operation, the secondary part should always be within the secondary part, such that force acts uniformly on all of the sections of the secondary part.

Furthermore, all of the windings of in each case each of the plurality of phases should be connected in series. This makes it possible to make optimum use of the specifically chosen sequence of the association of the windings with the phases.

It is likewise preferable for the secondary part to have permanent magnets which are curved on the side facing the primary part and cover only a predetermined part of the axial extent of a magnetic pole $\tau_p$, and have a magnetization direction which is essentially radial and is directed toward their outer surface. In this case, it is particularly advantageous for the permanent magnets to have a D-shaped contour transversely with respect to the travel direction of the secondary part. The force oscillations, and therefore the force ripple, are considerably reduced by the permanent magnets being curved with respect to the primary part in conjunction with partial pole curvature of these permanent magnets and, in particular, with a magnetization direction which is directed essentially radially with respect to the outer surface of the permanent magnets.

According to another aspect of the invention, a combination drive includes the linear motors as described above with the secondary part being hollow, and a rotary motor arranged in the secondary part. The combination drive has reduced linear force ripple.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 4 shows a schematic view of the permanent magnets of the secondary part of the linear motor shown in FIG. 1.

DETAILED DESCRIPTION OF PREFERRED EMBODIMENTS

Figure 1:
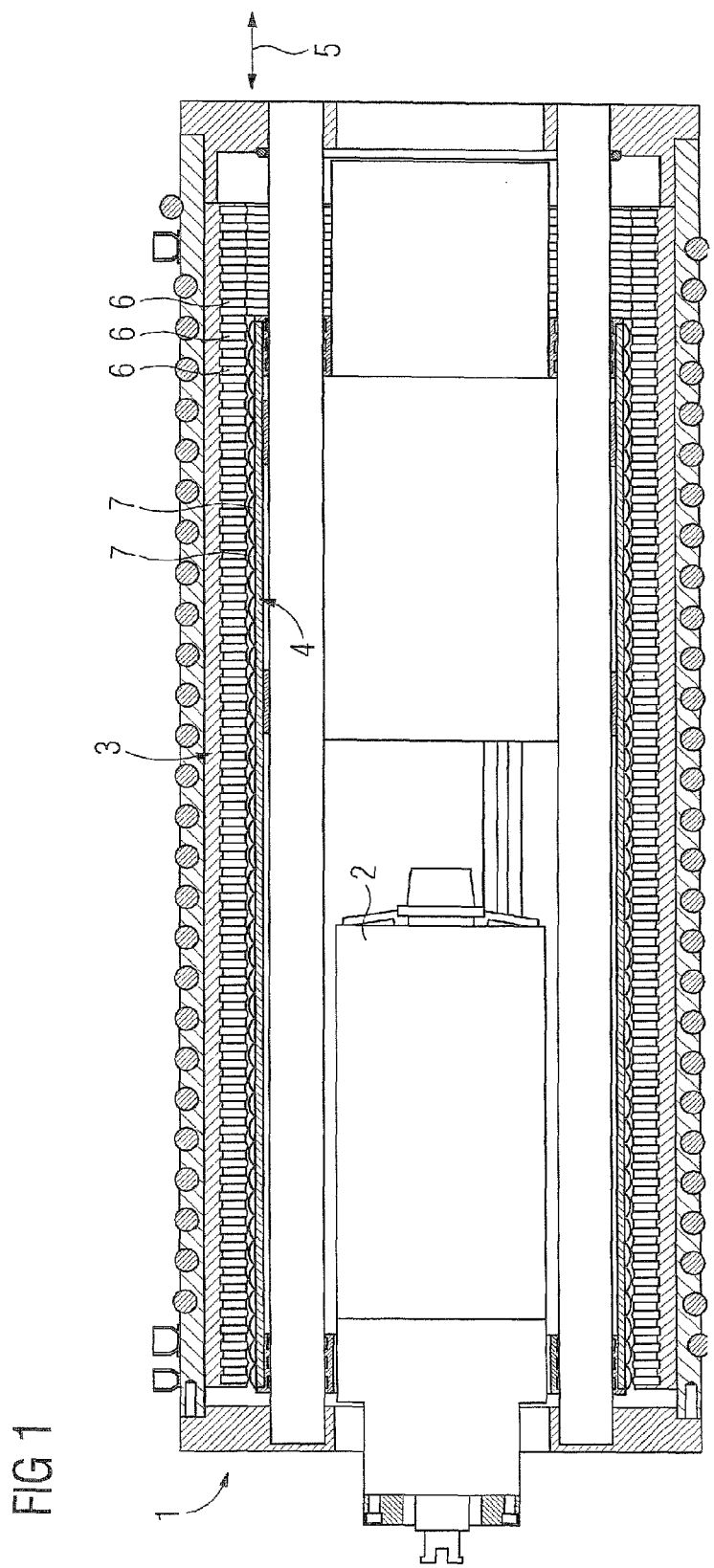
FIG. 1 shows a combination drive with a linear motor according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a cylindrical combination drive as can be used, for example, for milling machines, robots, die-casting machines and the like. It consists of a cylindrical linear motor 1 and a rotating motor 2. The linear motor 1 has a primary part 3 which has a hollow-cylindrical shape. A secondary part 4, which is likewise hollow-cylindrical, is located within the primary part 3. This secondary part 4 is arranged coaxially with the primary part 3 and can be moved linearly in it, resulting in the secondary part 4 moving in the direction as indicated by the arrow 5 with respect to the primary part 3. The movement direction 5 runs parallel to the longitudinal axis of the cylindrical linear motor, to be precise of the primary part 3 or of the secondary part 4.

The primary part 3 has numerous inner slots (cf. FIG. 2) in which windings 6 are inserted. The slots and therefore also the windings 6 run in the circumferential direction of the cylindrical primary part 3. Alternatively, the linear motor and therefore the primary part with the secondary part may also be cuboid, that is to say with the linear motor having a rectangular cross section. In this case, the slots in the interior of the primary part are likewise circumferential.

The cylindrical secondary part 4 is essentially in the form of a sleeve, and permanent magnets 7 are arranged on its surface facing outwards. These permanent magnets 7 interact in a known manner with the dynamically produced magnet poles of the primary part 3, in order to move the secondary part 4 axially with respect to the primary part 3.

In this case, the rotating motor 2 is installed in the hollow secondary part 4 and is also moved linearly, corresponding to the movement of the secondary part 4.

Figure 2:
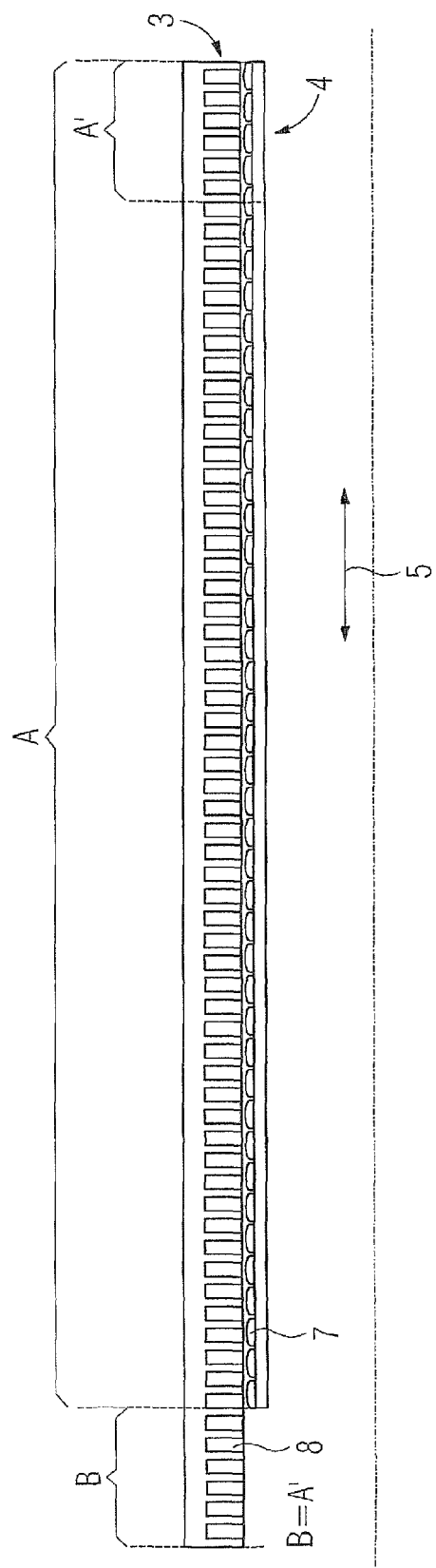
FIG. 2 shows a detail of the linear motor shown in FIG. 1.

FIG. 2 shows a partial section through the active parts of the linear motor 1. Illustrated, in particular, is a longitudinal section through the upper part, in each case of the primary part 3 and secondary part 4 of the linear motor as shown in FIG. 1. In contrast to FIG. 1, no windings are shown in FIG. 2, as a result of which it is in fact possible to see the numerous slots 8 in the primary part 3, which are separated from one another in the axial direction, that is to say in the movement direction 5. The secondary part 4, which is fitted with permanent magnets 7, is located under and within the primary part 3.

The primary part 3 has a primary part length in the axial or movement direction 5. The secondary part 4 likewise has a secondary part length in the movement direction 5. The secondary part length is somewhat shorter than the primary part length. The difference between the primary part length and the secondary part length corresponds to the maximum travel of the linear motor. This is intended to ensure that the secondary part 4 is always located completely within the primary part 3 during the movement of the linear motor.

The primary part is divided into two sections A and B. The first section A extends from one end or one end face with a length which corresponds to the secondary part length. The section A accordingly has a total of N slots 8. The second section B is directly adjacent to the first section A and extends as far as the opposite end or the opposite end face of the primary part 3. The second section B accordingly has an axial length which corresponds to the difference between the primary part length and the secondary part length. There are M slots in the section B. The slot pitch in both sections A and B is the same in the axial direction. The overall primary part accordingly has M+N slots 8 in the axial direction.

A subsection A' can be defined within the first section A, on the side of the primary part 3 opposite the second section B, having the same axial length as the second section B, and starting at the end face. The subsection A' has the same number of slots 8 as the second section B. During the movement of the secondary part 4 with respect to the primary part 3, the secondary part moves into the second section B to the same extent as it moves out of the subsection A' on the other side.

The lowest common multiple kgV of the number of slots N and the number of poles p should be high. In particular: kgV (N, 2p)≧N·p. In this case, this applies to the section A. As has been stated above, the section B corresponds only to a geometric continuation of the first section A. In this case, the section B is shorter than the section A.

Figure 3:
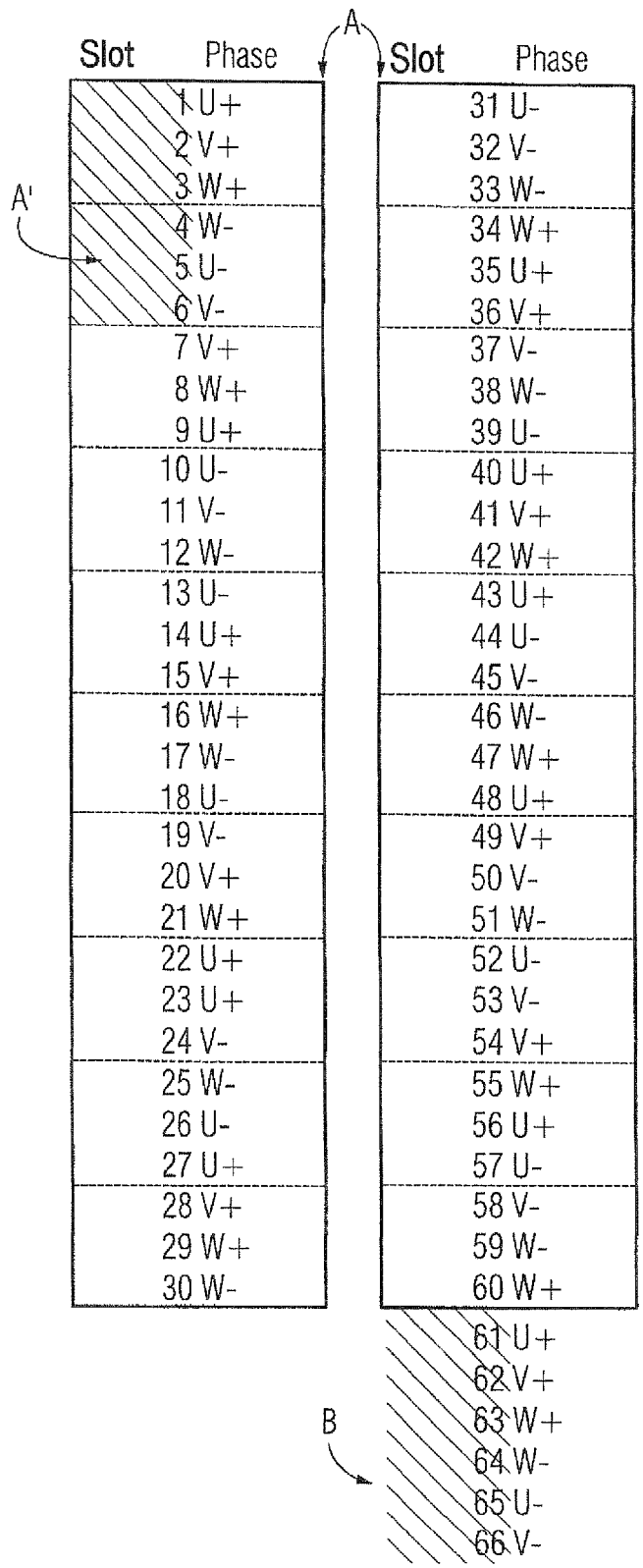
FIG. 3 shows an association of the windings in the slots in the primary part of the linear motor shown in FIG. 1 with the phases.

FIG. 3 shows an association diagram, according to which, in one exemplary embodiment, windings 6 in the slots 8 in the primary part 3 are associated with the three phases U, V and W of a three-phase power supply. In this case, the primary part 3 has a total of 66 slots, into each of which one winding is inserted. The slots and windings are therefore arranged axially one behind the other, and can be subdivided into two sections A and B, in a corresponding manner to the example shown in FIG. 2. The slots and windings with the slot numbers 1 to 60 are associated with the area A, and the slots and windings with the slot numbers 61 to 66 are associated with the area B. Each individual slot or winding is associated with one of the phases U, V, W, as shown in the diagram in FIG. 3. In addition, each winding is associated with a first winding sense + or an opposite, second winding sense −. Considered in the axial direction of the linear motor, the first winding sense is, for example, directed clockwise, and the second winding sense is directed counter clockwise.

In the present case, the linear motor is designed for three phases. The number of slots and windings in the first section A is a multiple of three, in this case 60. The number of slots and windings in the second section B is likewise a multiple of three, specifically 6. According to the invention, the aim is now to make the phase association in combination with the winding sense asymmetric. This asymmetry should preferably be as great as possible, in order to achieve as little force ripple as possible.

According to the invention, the windings of the primary part are subdivided in the axial direction into groups with the same number of windings. In this case, the sequence of the association of the windings with the phases in at least one of the groups in the axial direction in combination with the winding sense of the windings should differ from the sequence of the association in combination with the winding sense of each of the other groups within the first section of the primary part. In the example shown in FIG. 3, the windings and slots are divided, by way of example, into groups of three. In this case, the first group comprises the slots and windings 1 to 3, the second group the windings 4 to 6, the third group the windings 7 to 9, . . . and the 20$^{th}$ group the windings 58 to 60 in the section A. Within the first group, the windings associated with the phases U, V, W each have the first winding sense +. Within the second group, the windings associated with the phases each have the second winding sense −, in the sequence W, U, V. As in the first group, however, the phases U, V, W are associated with the second winding sense − for the three windings 31 to 33 within the 11$^{th}$ group. Within the 12$^{th}$ group, the windings 34 to 36 are likewise associated, in the way as in the second group, with the phases W, U and V, but in each case with the first winding sense +. The 10$^{th}$ group with the windings 28 to 30 is associated with the phase association windings sense combination V+, W+, W−, and the $20^{th}$ group with the windings 58 to 60 is associated with the phase association winding sense combination V−, W−, W+. The further associations are shown in FIG. 3. Two winding groups are provided in the section B, specifically the windings 61 to 63 on the one hand and the windings 64 to 66 on the other hand. The first of these two groups has the same phase association winding sense combination U+, V+, W+ as the first winding group in the section A. In the same way, the second of the two winding groups with the windings 64 to 66 in the section B has the same phase association winding sense combination W−, U−, V− as the second group in the section A.

As can be seen from FIG. 3, the sequence of the phase association W, U, V in the second group is not repeated in the first half of the section A. The winding sense within the second group is −. Since, in the present example, the phase association in the second half is identical to that in the first half, but with the opposite winding sense, the phase sequence W, U, V once again occurs in the $12^{th}$ group with the windings 34 to 36, but with the opposite winding sense +. In consequence, the phase association winding sense combination W−, U−, V− of the windings 4 to 6 is not repeated throughout the entire first section A of the primary part. This also applies in the same sense, for example, to the third and fifth groups in the section A.

The windings of the primary part can also be subdivided into groups with different numbers of windings. For example, the primary part can also be subdivided into groups of two, four, five, six etc. If appropriate, a different phase association winding sense combination must then be chosen for the individual windings than that in FIG. 3.

When defining the association sequence of the windings with the phases, it is also necessary to ensure that the number of the windings which are associated with the three phases U, V and W in the section B is the same. During movement of the secondary part, this results in little force ripple, as can be seen directly, for example, in FIG. 3. The sequence of the windings associated with the phases U, V and W in the section B in this case corresponds to the subsection A' located at the start of section A.

All of the windings of one phase U, V or W are connected in series. This applies irrespective of the winding sense of the windings.

Furthermore, the force ripple can be reduced by the magnets 7 of the secondary part 4 having a contour as described in the document EP 2 073 351 A1. A contour such as this is illustrated schematically in FIG. 4. The sketch shows the secondary part 4 of a cuboid linear drive or a rolled-out cylindrical secondary part 4, (that is to say projected onto a plane). The secondary part 4 has a soft-magnetic mount 9 for the magnetic return path. Permanent magnets 7 are located on the mount, with their longitudinal direction extending transversely with respect to the movement direction 5 of the linear drive. By way of example, the permanent magnets 7 are adhesively bonded to the mount 9. The curved surface of the permanent magnets 7 faces upwards, that is to say away from the mount 9. The curvature 10 can be seen on the end face of each permanent magnet. The magnetization direction 11 corresponds to the normal direction of each surface element of the permanent magnet 7. That is to say the permanent magnets have a magnetization direction which is essentially radial with respect to the surface which faces the primary part. By way of example, the permanent magnets 7 are annotated as north pole N and south pole S in FIG. 4. This annotation relates to that magnetic pole of the permanent magnet which faces the air gap. The corresponding opposing pole is located on the side 12 of each permanent magnet 7 facing the mount 9.

With respect to the movement direction, the permanent magnets 7 cover only a portion $X_B$ of the entire magnetic pole $\tau_p$. This partial pole coverage $X_B$ is preferably in a range between $0.5 \cdot \tau_p$ and $0.9 \cdot \tau_p$.

The force ripple is considerably reduced by the configuration of the permanent magnets with divergent lines of force, that is to say with a quasi-radial anisotropy (alignment) and/or permanent magnets which have a larger air gap in the direction of the pole edge.

As has already been mentioned above, the design measures and associations of the windings with the various phases as described above likewise result in considerable contributions to reducing the force ripple. For example, the impedances of the three phases in the exemplary embodiment mentioned above are virtually identical. This allows uniform heating of the three phases, and simple current regulation. The required regulated gain can be reduced, as a result of which the current harmonic losses are reduced during operation, which in the end leads to a cooler machine.

The secondary part, which is fitted with magnets, is shorter than the primary part by the maximum travel. The force ripple from the edge effects (magnetic poles at iron edges), as is evident in the case of a variant with a secondary part that is longer than the primary part, is therefore not relevant. In addition to the high kgV (N, 2p), the edge recessing of the magnets counteracts the force ripple resulting from the slotted primary part. Overall, the features mentioned above therefore make it possible to produce a linear motor whose force ripples are considerably less than 1% of the rated force.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A linear motor comprising:
   a primary part in form of a cylinder or cuboid and having a plurality of windings sequentially arranged in an axial direction and subdivided in the axial direction into groups having an identical number of windings, each of the windings associated with one phase of a multi-phase system, with the primary part being divided in the axial direction into a first section and a second section, wherein an identical number of windings in the second section is associated with each of the phases; and
   a secondary part having a secondary part length, wherein an axial length of the first section corresponds to the secondary part length,
   wherein a sequence of the association of the windings with the phases in combination with a winding sense of the windings in at least one of the groups in the axial direction differs from the sequence of the association of the windings with the phases in combination with a winding sense of the windings in each of the other groups within the first section of the primary part, and wherein the sequence of the association of the windings with the phases in combination with a winding sense of the windings in the second section corresponds to the association of the windings with the phases in combination with a winding sense of the windings in a subsection of the first section having an axial length identical to that of the second section and is arranged at the end of the first section facing the second section.

2. The linear motor of claim 1, wherein the windings are constructed for three-phase operation.

3. The linear motor of claim 1, wherein the primary part has in the first section a number of slots N and a number of pole pairs p, with: kgV (N, 2p)≧N·p, wherein kgV indicates a least common multiple.

4. The linear motor of claim 1, wherein the first section is axially subdivided into a first half and a second half, and wherein the windings in the first half have a different winding sense from the windings in the second half.

5. The linear motor of claim 1, wherein a maximum travel of the linear motor is less than or equal to the axial length of the second section of the primary part.

6. The linear motor of claim 1, wherein the secondary part comprises permanent magnets having a curved surface on a side facing the primary part and cover only a predetermined part of an axial extent of a magnetic pole $\tau_p$, and have a substantially radial magnetization direction with respect to the curved surface.

7. The linear motor of claim 6, wherein the permanent magnets have a D-shaped contour transversely with respect to a travel direction of the secondary part.

8. A combination drive comprising:
a linear motor with a primary part in form of a cylinder or cuboid and having a plurality of windings sequentially arranged in an axial direction and subdivided in the axial direction into groups having an identical number of windings, each of the windings associated with one phase of a multi-phase system, with the primary part being divided in the axial direction into a first section and a second section, wherein an identical number of windings is associated with each of the phases in the second section,
a hollow secondary part having a secondary part length, wherein an axial length of the first section corresponds to the secondary part length,
and a rotary motor arranged in the hollow secondary part,
wherein a sequence of the association of the windings with the phases in combination with a winding sense of the windings in at least one of the groups in the axial direction differs from the sequence of the association of the windings with the phases in combination with a winding sense of the windings in each of the other groups within the first section of the primary part, and
wherein the sequence of the association of the windings with the phases in combination with a winding sense of the windings in the second section corresponds to the association of the windings with the phases in combination with a winding sense of the windings in a subsection of the first section having an axial length identical to that of the second section and is arranged at the end of the first section facing the second section.

* * * * *